United States Patent [19]
Oberländer

[11] Patent Number: 5,949,902
[45] Date of Patent: Sep. 7, 1999

[54] PATTERN RECOGNITION METHOD WHICH UTILIZES A CALIBRATION RULE

[75] Inventor: Matthias Oberländer, Ulm, Germany

[73] Assignee: Siemens AG, Munich, Germany

[21] Appl. No.: 08/542,348

[22] Filed: Oct. 12, 1995

[30] Foreign Application Priority Data

Oct. 12, 1994 [DE]    Germany ............................ 44 36 408

[51] Int. Cl.⁶ .................................................. G06K 9/66
[52] U.S. Cl. ........................................... 382/159; 382/224
[58] Field of Search .................................... 382/155, 159, 382/161, 181, 160, 224, 227, 228, 2.26, 217, 218, 209; 395/2.41; 358/406; 706/15

[56] References Cited

U.S. PATENT DOCUMENTS

| | | | |
|---|---|---|---|
| 4,066,999 | 1/1978 | Spanjersberg | 382/160 |
| 4,802,103 | 1/1989 | Faggin et al. | 395/24 |
| 5,075,896 | 12/1991 | Wilcox et al. | 382/228 |
| 5,122,969 | 6/1992 | Seshimoto et al. | 364/497 |
| 5,159,644 | 10/1992 | Martin et al. | 382/155 |
| 5,257,323 | 10/1993 | Melen et al. | 382/228 |
| 5,335,293 | 8/1994 | Vannelli et al. | 382/110 |
| 5,337,371 | 8/1994 | Sato et al. | 382/155 |
| 5,396,565 | 3/1995 | Asogawa | 382/155 |
| 5,457,541 | 10/1995 | Burns | 358/298 |
| 5,787,189 | 7/1998 | Lee et al. | 382/224 |

FOREIGN PATENT DOCUMENTS 41 33 590   1/1993   Germany .

OTHER PUBLICATIONS

Specht, Donald F.; "Generation of Polynomial Discriminant Functions for Pattern Recognition", IEEE Transactions on Electronic Computers, vol. EC–16, No. 3, Jun. 1967, pp. 308–319.

Sklansky, Jack; "Learning Systems for Automatic Control", IEEE Transactions on Automatic Control, vol. AG–11, No. 1, Jan. 1966, pp. 6–19.

*Primary Examiner*—Jon Chang
*Attorney, Agent, or Firm*—Venable; Robert Kinberg; Michael A. Sartori

[57] ABSTRACT

For a pattern recognition method, a calibration rule is generated during a training phase for evaluations supplied by a classifier with regard to possible identifiers and, during a recognition operation, the evaluations estimated by the classifier are replaced by other values on the basis of the calibration rule.

8 Claims, 1 Drawing Sheet

5,949,902

PATTERN RECOGNITION METHOD WHICH UTILIZES A CALIBRATION RULE

CROSS-REFERENCE TO RELATED APPLICATIONS

The present application claims the right of priority with respect to application Ser. No. P 44 36 408 filed Oct. 12, 1994 in Germany, the disclosure of which is incorporated herein by reference.

BACKGROUND OF THE INVENTION

The invention relates to a pattern recognition method, wherein for an object to be recognized with regard to one or several identifiers from a predetermined set of identifiers, respective numerical, discrete evaluations, each within an evaluation scale, are estimated and wherein, on the basis of these evaluations, a decision is made in a decision stage regarding the allocation of the object to be recognized to an identifier.

Pattern recognition methods are particularly important in automatic control engineering and in machine text processing, for instance, in optical character recognition ("OCR") readers of automatic letter distribution systems or the analysis of forms. Here, one starts from a limited set of identifiers, for example, the alphanumeric character set in different styles plus special characters, and it is the object of the recognition method to allocate an object which is to be recognized to an identifier as reliably as possible.

For this purpose, numeric evaluations are estimated in an estimating stage of a classifier for the object to be recognized with regard to one or several possible identifiers, following thorough preprocessing of the object data; in a subsequent decision stage, these evaluations are used as a basis for the decision regarding the allocation of the object to an identifier.

The allocation decisions are tainted with residual errors resulting from rejections and the acceptance of inapplicable identifiers (substitutions). The desire to accomplish a lower rejection rate and, at the same time, a lower substitution rate means that contradictory demands are placed on the automatic decision-making process.

From DE 41 33 590 A1 a method is known for the classification of signals representing amplitude values, wherein characteristics are extracted from the signals and occurrence probabilities are derived from these. From the entirety of the derived occurrence probabilities, a decision quantity is calculated and compared to a threshold value.

In IEEE Trans. on Electr. Comp., Vol. EC-16, No. 3, June 1967, p. 308–319, a method for the generation of parameters of a polynomial function for a classifier is known, wherein for each category possible during classification a probability density function is estimated such that classification can take place according to a so-called Bayes decision rule.

In IEEE Trans. on Autom. Control, Vol. AC-11, No. 1, January 1966, p. 6–19, adaptive systems for automatic controls having feedback loops to a classifier are described. In this context, the problems of decision theory and stochastic approximation are dealt with in particular. The advantages of trainable adaptive threshold setting are emphasized.

SUMMARY OF THE INVENTION

It is an object of the present invention to set forth a pattern recognition method which makes it possible to simplify the optimization of the decision-making process. It is intended to improve the reliability of the decision for cases with several evaluations for competing identifiers.

The above and other objects are accomplished in accordance with the invention, wherein, in the context of the method first described above, during a training phase, a calibration of the evaluations takes place by way of a known set of objects in such a manner that the relative portion factor $R(c)$ of the applicable identifiers within all of the evaluation processes falling into this evaluation increment is determined for each increment c of the evaluation scale and that, during the recognition operation, the estimated evaluation c is respectively replaced by the portion factor $R(c)$ determined for it during the training phase.

For an evaluation of the identifiers, which is calibrated according to the invention, the possibility advantageously ensues that, independently of the frequency distribution of the occurrence of objects, an adjustment of the decision stage for an optimum ratio of rejections and substitutions can be carried out with regard to the individual identifiers by predetermining weight factors for rejections and substitutions. In particular, an identifier-independent, adjustable decision threshold can be predetermined in the decision stage for this purpose.

Preferably, the calibration takes place in an identifier-specific manner and, in the event of the simultaneous estimation of evaluations for competing identifiers, while taking combinations of identifiers into account.

The invention is particularly advantageous in an OCR reader, for example, an address reader in mail automation systems or a form reader in the banking business.

In the following, the invention is illustrated in detail by way of embodiments with reference to the drawing figures.

DETAILED DESCRIPTION OF THE PREFERRED EMBODIMENTS

Figure 1:
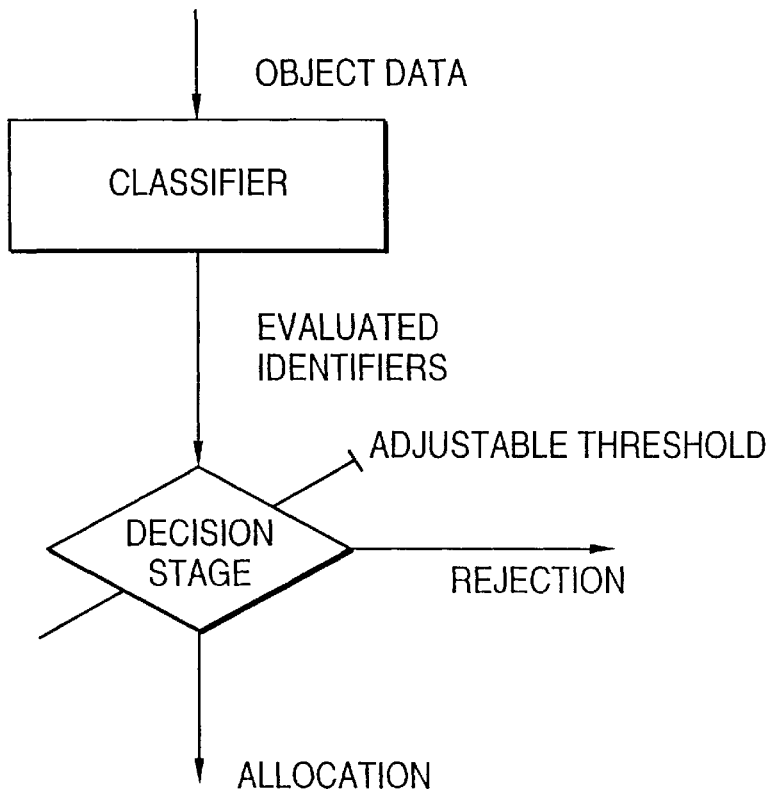
FIG. 1 is a simple model of a recognition system according to the invention.

FIG. 1 outlines a simple model of a recognition system. The system essentially comprises a classifier and a decider. Signal processing is digital. Data of an object to be recognized are fed to the classifier, e.g., in the form of a binary dot pattern. Details of the signal processing and a possible preprocessing, e.g., separation of successive characters for an OCR reader, are known in varied form from prior art.

The classifier examines the object data with regard to their compatibility with the different identifiers of an identifier set provided within the system and estimates a numerical value c within an evaluation scale for one or several possible identifiers, e.g., $0<c<1$ in increments of 0.05. As an easy example, all alphanumeric characters are assumed to be identifiers of the identifier set. The evaluations can be interpreted graphically as numerically quantified estimates of the credibility of a hypothesis, e.g., "The object represents a letter A!". Such evaluation methods are also known sufficiently from prior art.

In a training phase, the classifier is fed object data of a plurality of known objects. The evaluations supplied by the classifier in such a training phase are detected and are analyzed by comparing them with the identifiers applicable to the known training objects in such a manner that, for each increment of the evaluation scale (or at least of a relevant portion of the same), all events which are evaluated with this increment are detected and the relative portion R(c) of the applicable identifiers among these is determined.

The number of training objects in the training phase is selected to be of such a level that the different identifiers of the identifier set occur, as a rule, multiple times in all increments of the evaluation scale.

Separately for each increment of the evaluation scale, the number of evaluation processes, which fall into this evaluation increment, is determined. Also separately for each evaluation increment, the portion R(c) of the correct identifiers, i.e., those processes in which the evaluated identifier agrees with the known actual identifier of the object to be recognized, is determined from the total number of evaluation processes counted in an evaluation increment. In the ideal case, this portion is identical to the value c of the relevant evaluation increment. In the real case, the portion R(c) of the correct identifiers intended for an evaluation increment c will deviate more or less from the value of the evaluation increment, which means that, the classifier is too optimistic (R(c)<c) or too pessimistic (R(c)>c) in its evaluations during estimating. Thus, a portion R(c) of correct identifiers within the respective increment is determined for each evaluation increment of the evaluation scale during the training phase.

The result is an allocation of a portion R(c) to each evaluation increment c, which allocation can be considered as a calibration of the credibility estimated by way of the evaluation c to a determined actual reliability.

The allocation of R(c) to c, which is determined in the training phase, is stored as a calibration rule. During recognition operation, the evaluations c, which are estimated by the classifier for unknown objects that are to be recognized, are then replaced as calibrated evaluations in a calibration stage according to the stored allocation rule by the portions R(c) determined during the training phase. These calibrated evaluations are used as a basis for an identifier allocation in a subsequent decision stage.

If only a part of the evaluation scale is of interest, e.g., due to a concentration of the evaluated identifiers in the upper region of the evaluation scale because of a preselection in previous processing steps, this process can be limited to the segment of the scale which is of interest.

For the adjustment of the decision threshold of a decision stage, one cost weight factor each can be applied to a rejection as well as to a substitution; the cost weight factors are dependent on the respective application.

It turns out that, in the case of a fixed cost weighting of substitutions and rejections, the evaluations calibrated in this manner make possible an optimum adjustment of the decision threshold in terms of costs without any further knowledge, particularly without knowledge of the occurrence frequency of the individual evaluations.

The calibration of evaluations according to the invention is particularly advantageous in an embodiment with identifier-specific calibration to reduce the error rate of a recognition system which provides for the possibility of a simultaneous evaluation of competing identifiers for an object that is to be recognized. Here, the finding is utilized that the identifier-specific allocation rules have different characteristics over the evaluation scale for different identifiers, and an identifier-specific calibration may effect an exchange of the priority of competing identifiers and a reduction of the error rate. Preferably, the identifier-specific calibration takes account of the combination of competing identifiers, with a limitation to statistically frequent combinations being admissible. An example for this is described in detail in the following.

In a training phase, identifier-specific calibrations are carried out respectively for two competing identifiers A and B in that all evaluation processes regarding identifiers A or B as well as the portions of correct identifiers, which can be detected for these, are determined in the manner described for each evaluation increment of the evaluation scale and are stored as two allocation rules $R_A(c)$ or $R_B(c)$. The stored allocation rules are outlined as two functional curves in an R-c diagram in FIG. 2. As a rule, the curves have a different course for different identifiers. The reference line R(c)=c is plotted as a dotted line. In the example illustrated here, the classifier estimate is too pessimistic for both A and B. It is assumed that for a concrete object which is to be recognized, the classifier gave an evaluation $c_{oA}$ for identifier A and a lower evaluation $c_{oB}$ for identifier B during the recognition operation. From the stored calibration rule it is known that, in the training phase, the identifiers evaluated with $c_{oA}$ have a correct portion $R_A(c_{oA})$ and the identifiers evaluated with $c_{oB}$ have a correct portion $R_B(c_{oB})$. According to the invention, the evaluations $c_{oA}$ and $c_{oB}$ estimated by the classifier are replaced by the values for $R_A(c_{oA})$ and $R_B(c_{oB})$, respectively, which are taken from the stored calibration rules as a new, calibrated evaluation $c'_{oA}$ and $c'_{oB}$, respectively. In the example outlined here, which was based on $c_{oA} > c_{oB}$, the evaluation priority is reversed with $c'_{oA} < c'_{oB}$ by the calibration.

Figure 2:
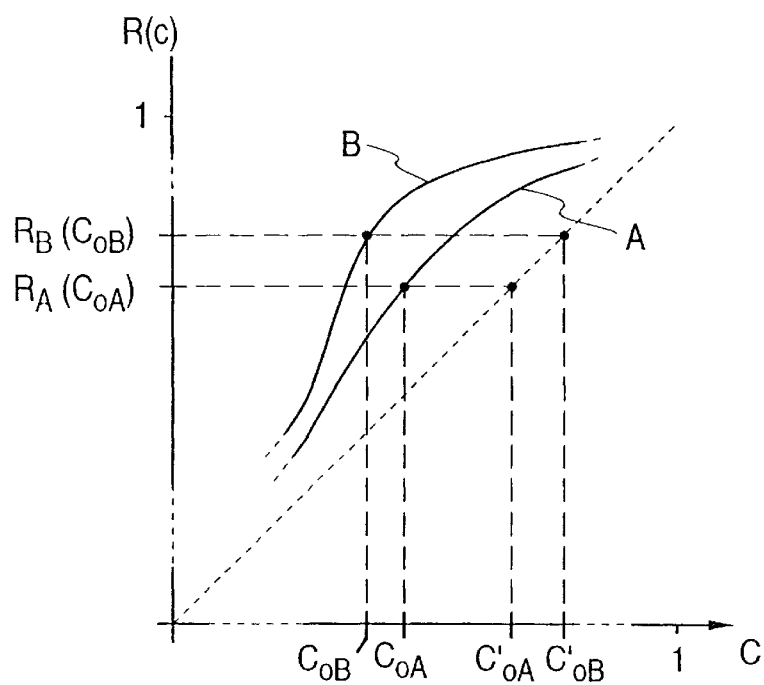
FIG. 2 is a graph showing stored allocation rules in the form of two functional curves in an R-c diagram for explaining an example of the method according to the invention.

For the calibration curves outlined in FIG. 2, the combination of competing identifiers can also be considered in that for the generation of the calibration rules in the training phase only those cases are considered in which the identifiers A and B are evaluated simultaneously. This combination evaluation can be limited to the identifier combinations which occur with particular frequency.

In the event that competing identifiers for the same object are evaluated simultaneously, preferably only the identifier which was given the highest evaluation after calibration is subjected to a threshold comparison in the decision stage.

It will be understood that the above description of the present invention is susceptible to various modifications, changes and adaptations, and the same are intended to be comprehended within the meaning and range of equivalents of the appended claims.

What is claimed is:

1. A pattern recognition method for recognizing an object using one of a plurality of identifiers, the process comprising:

in a training phase,
estimating numerical and discrete evaluations for each of the plurality of identifiers for each of a plurality of objects, each evaluation corresponding to one of a plurality of increments of an evaluation scale;
determining a relative portion R(c) of correct identifiers for each increment of the evaluation scale according to the evaluations for each increment of the evaluation scale, thereby forming a calibration rule relating increments of the evaluation scale to relative portions R(c); and in a recognition phase,
estimating a numerical and discrete evaluation c for the object to be recognized, the evaluation c corresponding to one of the increments of the evaluation scale;
replacing the evaluation c with a relative portion R(c) according to the calibration rule;
allocating one of the identifiers to recognize the object to be recognized according to the relative portion R(c) replacing the evaluation c.

2. Method according to claim 1, wherein forming a calibration rule in the training phase comprises:

forming a calibration rule for each of the identifiers.

3. Method according to claim 2, wherein estimating the evaluation c in the recognition phase comprises estimating a numerical and discrete evaluation c for each of the identifiers;

wherein replacing the evaluation c in the recognition phase comprises replacing the evaluation c for each of the identifiers with a relative portion R(c) according to the calibration rule for each of the identifiers.

4. Method according to claim 3, wherein the recognition phase further comprises:

replacing the relative portion R(c) for each of the identifiers with a calibrated evaluation c' according to an ideal relationship between relative portions R(c) and increments of the evaluation scale.

5. Method according to claim 1, wherein forming a calibration rule in the training phase comprises:

forming a calibration rule for a combination of at least two of the identifiers.

6. Method according to claim 1, wherein in the training phase the correct identifiers comprise the identifiers which agree with actual identifiers for the plurality of objects.

7. Method according to claim 1, wherein in the recognition phase, one of the identifiers is allocated according to an identifier-independent, adjustable threshold.

8. Method according to claim 1, wherein the method is used with an optical character recognition reader.

* * * * *